United States Patent Office 3,102,126
Patented Aug. 27, 1963

3,102,126
17-AMINOMETHYL ANDROSTANES
Pierre Crabbé, Mexico City, Mexico, assignor, by mesne assignments, to Syntex Corporation, a corporation of Panama
No Drawing. Filed Mar. 1, 1962, Ser. No. 176,771
Claims priority, application Mexico Nov. 17, 1961
21 Claims. (Cl. 260—397.4)

The present invention relates to certain new cyclopentanophenanthrene derivatives and to a method for the preparation thereof.

More particularly, it relates to the novel 17-aminomethyl derivatives of the androstane series, which are powerful antiovulatory agents. Such compounds are represented by the following formulas:

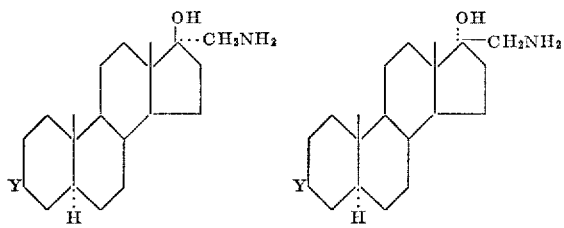

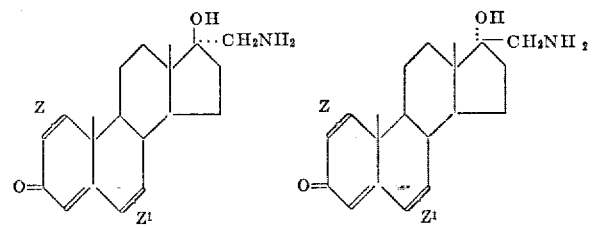

In the above formulas Y represents a keto group or a free or esterified β-hydroxyl group; Z and $Z^1$ represent a single or a double bond between C-1,2 and C-6,7.

The acyl groups referred to above derive from a carboxylic acid of less than 12 carbon atoms, saturated or unsaturated, of straight, branched, cyclic or mixed aliphatic-cyclic chain, substituted or not with other functional groups such as hydroxyl, alkoxy, amino, halogen or other groups. Typical such esters are the acetate, propionate, valerate, enanthate, undecenoate, benzoate, trimethylacetate, terbutylacetate, phenoxyacetate, cyclopentylpropionate, aminoacetate and β-chloropropionate.

The method employed for preparing the compounds object of the present invention is illustrated by the following series of reactions:

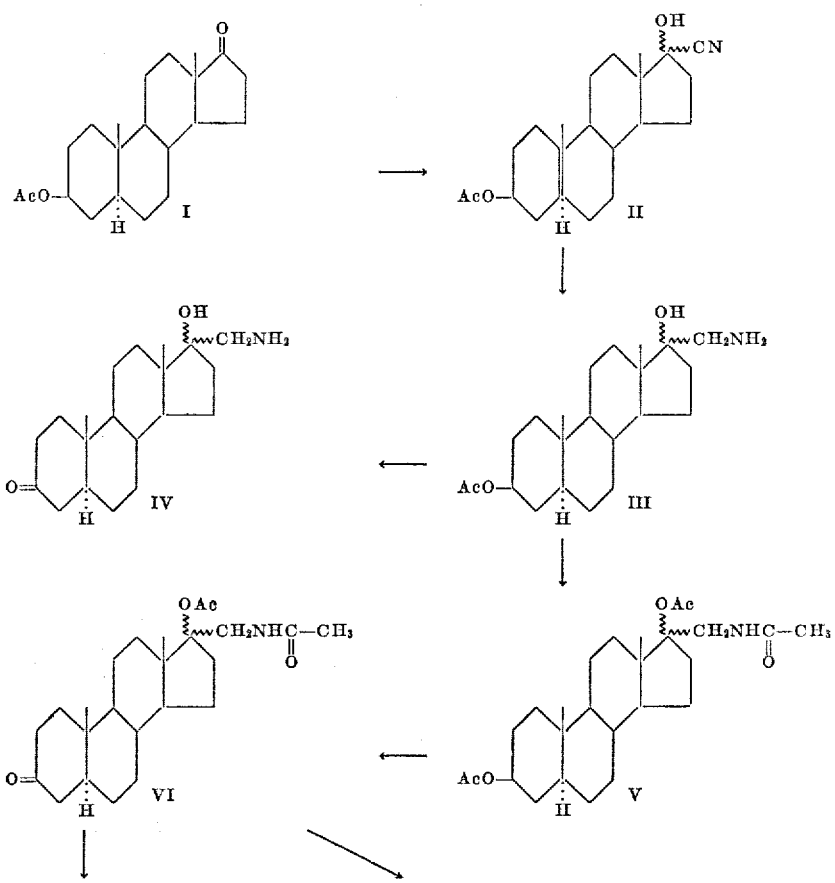

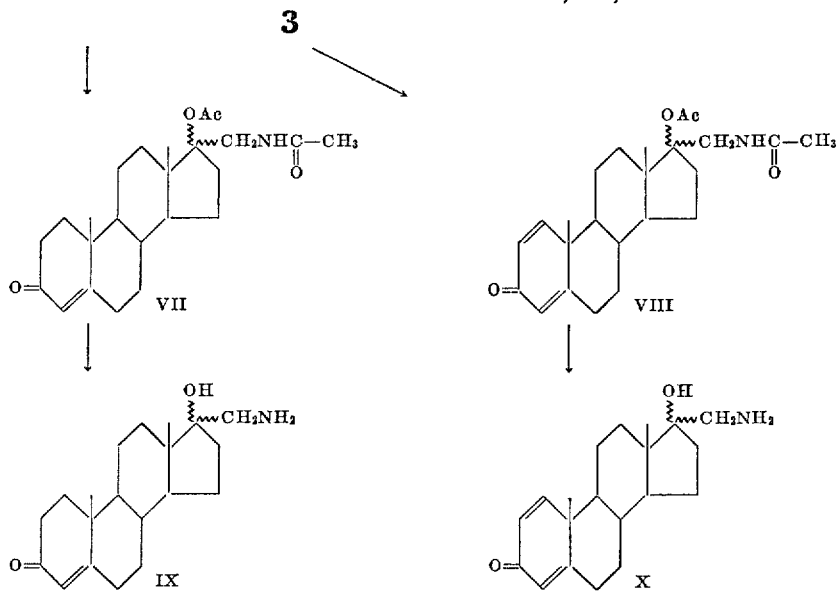

In the above formulas Ac represents the acyl group and preferably the acetyl group. The wavy line at C-17 indicates the α or β steric configuration for the substituents thereat.

When practicing the process outlined above, isoandrosterone acetate (I) is allowed to react with potassium cyanide in mixture with acetic acid, methanol and chloroform, at low temperature, preferably at 0° C., and for a period of time between 18 and 24 hours, to produce a mixture of epimeric 17-cyano derivatives, that is, the 3-aectate of 17α-cyano-androstane-3β,17β-diol and the acetate of 17β-cyano-androstane-3β,17α - diol (II), which may be separated by chromatography, fractional crystallization, etc. By catalytic hydrogenation in acetic acid solution and using platinum oxide as catalyst, the 17-cyano compounds are converted into the corresponding 17-aminomethyl derivatives (III).

Conventional saponification of the acetoxy group at C-3, for example by refluxing with methanolic potassium hydroxide, followed by oxidation with chromic acid in acetic acid solution or in acetone solution in sulfuric acid medium, leads to the formation of the corresponding ketones, i.e. 17α-aminomethyl-androstan-17β-ol-3-one and 17β-aminomethyl-androstan-17α-ol-3-one (IV).

For preparing the unsaturated ketones, it is necessary to protect the methylamino group previous to the introduction of the double bonds; for this purpose the 3-acetate of 17α-cyano-androstane-3β,17β-diol and its 17β-epimer (III) are treated with acetic anhydride in the presence of an acid catalyst such as perchloric acid or p-toluenesulfonic acid, to give the 3,17-diacetate of 17α-acetamidomethyl-androstane-3β,17β-diol or its 17β-acetamido epimer (IV). By selective saponification of the acetoxy group at C-3 under mild alkaline conditions, for example by treatment with potassium carbonate in methanol at room temperature, there are produced the 17-acetamidomethyl-3β - hydroxy-androstanes, which by oxidation with chromic acid in acetic acid solution or in acetone-sulfuric acid solution, are converted into the respective ketones (VI).

By treating these compounds with 2,3-dichloro-5,6-dicyano-1,4-benzoquinone in dioxane, at the reflux temperature and for a period of time between 8 and 16 hours, preferably for 10 hours, there are obtained mixtures of the Δ⁴ and Δ¹,⁴-dehydro derivatives (VII and VIII).

Alternatively, these compounds may be obtained by dibrominating the 17-acetoxy-17-acetamidomethyl-3-keto-androstanes (VI), followed by treatment of the 2,4-dibromo compounds thus formed, with sodium iodide and then dehydrohalogenating with collidine, thus giving rise to the formation of 17β-acetoxy-17α-acetamidomethyl-testosterone and 17α-acetoxy-17β acetamidomethyl-testosterone (VII). When the debrominated compound is directly allowed to react with collidine, there are obtained the Δ¹,⁴-dehydro compounds (VIII).

Finally, by treatment with methanolic potassium hydroxide under reflux, there are hydrolyzed the 17-acetamido group as well as the acetoxy group, thus obtaining the free 17-methylamino compounds, that is, 17α-methylamino-testosterone and 17β-methylamino-isotestosterone (IX), 17α-methylamino-Δ¹-dehydrotestosterone and 17β-methylamino-Δ¹-dehydro-isotestosterone (X).

For preparing the 6-dehydro derivatives, the Δ⁴-17-methylamino-androstenes as well as the Δ¹,⁴-17-methylamino-androstadienes (X and XI) are treated with chloranil in an adequate solvent, such as terbutanol, ter-amyl alcohol, xylene, etc.

The following examples serve to illustrate but are not intended to limit the scope of the invention:

*Example I*

A solution of 10 g. of isoandrosterone acetate, 28 cc. of acetic acid, 120 cc. of methanol and 80 cc. of chloroform was cooled to 0° C. and treated with 50 g. of potassium cyanide, which was added over a period of 20 minutes; the mixture was stirred for 2 hours further and then kept standing overnight. It was then diluted with water, extracted with ethyl acetate and the extract was washed to neutral, dried over anhydrous sodium sulfate and evaporated to dryness, thus affording a mixture of C-17 epimers of the 3-acetate of 17-cyano-androstane-3β,17-diol. By chromatography on 50 times its weight of washed alumina, the fractions eluted with benzene-chloroform (1:1) afforded the 3-acetate of 17α-cyano-androstane-3β,17β-diol, having a melting point of 165–170° C., [α]D —19° (CHCl₃).

A solution of 5 g. of the above crude compound in 100 cc. of glacial acetic acid was hydrogenated in the presence of 3.75 g. of platinum oxide catalyst, which had been previously reduced, until the absorption of hydrogen ceased. The catalyst was removed by filtration and the filtrate was evaporated to dryness. The residue was dissolved in chloroform, washed with 2% sodium hydroxide solution and with water to neutral, dried over anhydrous sodium sulfate and evaporated to dryness. By crystallization of the residue from acetone-hexane, there was obtained the 3-acetate of 17β-aminomethyl-androstane-3β,17α-diol; M.P. 223–225° C., [α]D —17° (CHCl₃). By chromatography there was also obtained another product with M.P. 236–237° C., [α]D —35° (17α-aminomethyl epimer).

*Example II*

A solution of 0.17 g. of potassium hydroxide in 2 cc. of water and 2.5 cc. of methanol was added to a boiling solution of 1 g. of the 3-acetate of 17α-aminomethyl-androstane-3β,17β-diol in 80 cc. of methanol. The mixture was refluxed for 2 hours further, cooled, neutralized with acetic acid and concentrated to a small volume under reduced pressure. It was then diluted with water and the precipitate formed was collected by filtration, thus giving 17α-aminomethyl-androstane-3β,17β-diol. In the same manner, the 3-acetate of 17β-aminomethyl-androstane-3β, 17α-diol was converted into the corresponding free compound.

*Example III*

A mixture of 500 mg. of 17α-aminomethyl-androstane-3β,17β-diol, 2 cc. of pyridine and 1 cc. of propionic anhydride was kept overnight at room temperature and then poured into water. The precipitate was collected, thus obtaining the 3-propionate of 17α-aminomethyl-androstane-3β,17β-diol.

In the same manner, but using caproic, enanthic and cyclopentylpropionic anhydrides as esterifying agents, there were obtained the respective 3-monoesters of 17α-aminomethyl-androstane-3β,17β-diol.

*Example IV*

A solution of 1 g. of 17α-aminomethyl-androstane-3β, 17β-diol in 20 cc. of acetone was cooled to 0° C. and with stirring and under an atmosphere of nitrogen it was treated with an 8 N solution of chromic acid (prepared by mixing 26 g. of chromium trioxide with 23 cc. of concentrated sulfuric acid and diluting with water to 100 cc.), until the color of the reagent persisted in the mixture. The mixture was stirred for 5 minutes at 0–5° C. and then diluted with water. The precipitate formed was collected by filtration, washed with water and dried under vacuum, thus yielding a crude product which upon crystallization from acetone-hexane afforded 17α-aminomethyl-androstan-17β-ol-3-one.

*Example V*

A mixture of 3 g. of the 3-acetate of 17α-aminomethyl-androstane-3β,17β-diol, 20 cc. of acetic anhydride and 100 mg. of p-toluenesulfonic acid was heated on the steam bath for 30 minutes, cooled to 0° C., and diluted with ice water. The precipitate formed was collected by filtration and recrystallized from acetone-ether, thus furnishing the 3,17-diacetate of 17α-acetamidomethyl-androstane-3β,17β-diol.

A solution of 1 g. of the above compound in 60 cc. of methanol was treated with a solution of 1 g. of potassium carbonate in 6 cc. of water and the mixture was stirred at room temperature for 2 hours. It was then diluted with water and the precipitate formed was recrystallized from acetone-hexane, thus furnishing the 17-monoacetate of 17α-acetamidomethyl-androstane-3β,17β-diol.

By oxidation with 8 N chromic acid in acetone, in accordance with the method described in Example III, there was obtained the acetate of 17α-acetamidomethyl-androstan-17β-ol-3-one.

A mixture of 500 mg. of the above compound, 10 cc. of dioxane and 350 mg. of 2,3-dichloro-5,6-dicyano-1,4-benzoquinone was refluxed for 10 hours and cooled. The precipitate of 2,3-dichloro-5,6-dicyano-1,4-benzohydroquinone formed during the reaction was removed by filtration and the filtrate was evaporated to dryness. The residue was chromatographed on 25 g. of washed alumina, thus affording the acetate of 17α-acetamidomethyl-Δ⁴-androsten-17β-ol-3-one and the acetate of 17α-acetamidomethyl-Δ¹,⁴-androstadien-17β-ol-3-one.

*Example VI*

A solution of 1 g. of 17α-acetamidomethyl-Δ⁴-androsten-17β-ol-3-one in 75 cc. of methanol was treated with 500 mg. of potassium hydroxide dissolved in 1 cc. of water and 5 cc. of methanol and the mixture was refluxed for 2 hours. After cooling it was neutralized with acetic acid and diluted with water until complete precipitation. The solid formed was collected and recrystallized from acetone-hexane, thus yielding 17α-aminomethyl-testosterone.

*Example VII*

By following the method described in the preceding example, 1 g. of the acetate of 17α-acetamidomethyl-Δ¹,⁴-androstadien-17β-ol-3-one was hydrolyzed with potassium hydroxide in methanol to produce 17α-aminomethyl-Δ¹,⁴-anadrostadiene-17β-ol-3-one.

*Example VIII*

There were repeated the methods of Examples IV and VII, but using as starting material 17β-aminomethyl-androstane-3β,17α-diol, thus obtaining 17β-aminomethyl-androstan-17α-ol-3-one, the 3,17-diacetate of 17β-acetamidomethyl-androstane-3β,17α-diol, the 17-monoacetate of 17β-acetamidomethyl-androstan-3β,17α-diol, the acetate of 17β-acetamidomethyl-androstan-17α-ol-3-one, the acetate of 17β-acetamidomethyl-isotestosterone, the acetate of 17β-acetamidomethyl-Δ¹-dehydro-isotestosterone, 17β-aminomethyl-isotestosterone and 17β-aminomethyl-Δ¹-dehydro-isotestosterone.

*Example IX*

A mixture of 1 g. of 17α-aminomethyl-testosterone, 2 g. of chloranil and 50 cc. of terbutanol was refluxed for 8 hours and cooled. The excess of chloranil was removed by filtration and washed with ethyl acetate; the filtrate was washed with 10% cold aqueous sodium hydroxide solution until the washings were colorless and then it was dried over anhydrous sodium sulfate and evaporated to dryness. By crystallization from methylene-chloride-ether, there was obtained 17α-aminomethyl-β⁴,⁶-androstadien-17β-ol-3-one.

*Example X*

In accordance with the method described in the preceding Example, 17β-aminomethyl-isotestosterone, 17α-aminomethyl-Δ¹-dehydrotestosterone and 17β-aminomethyl-Δ¹-dehydro-isotestosterone were respectively converted into 17β-aminomethyl-Δ⁴,⁶-androstadien-17α-ol-3-one; 17α-aminomethyl-Δ¹,⁴,⁶-androstatrien-17β-ol-3-one and 17β-aminomethyl-Δ¹,⁴,⁶-androstatrien-17α-ol-3-one.

*Example XI*

By following the method described in Example III but using 17β-aminomethyl-androstane-3β,17α-diol as the starting compound, theree was obtained the 3-propionate, 3-caproate, 3-enanthate and 3-cyclopentylpropionate.

I claim:

1. A compound of the following formula:

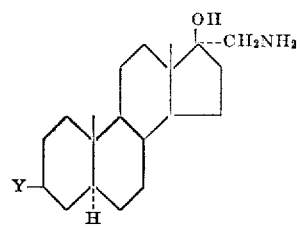

wherein Y is selected from the group consisting of keto, β-hydroxy and β-hydrocarbon carboxylic acyloxy of less than 12 carbon atoms.

2. 17α-aminomethyl-androstane-3β,17β-diol.

3. The 3-acetate of 17α-aminomethyl-anadrostane-3β, 17β-diol.

4. The hydrocarbon carboxylic acid esters of less than 12 carbon atoms of 17α-aminomethyl-androstane-3β,17β-diol.

5. 17α-aminomethyl-androstan-17β-ol-3-one.
6. A compound of the following formula:

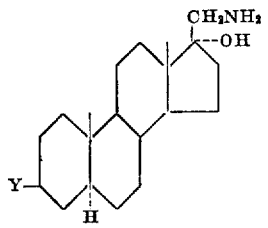

wherein Y is selected from the group consisting of keto, β-hydroxy and β-hydrocarbon carboxylic acyloxy of less than 12 carbon atoms.

7. 17β-aminomethyl-androstane-3β,17α-diol.
8. The 3-acetate of 17β-aminomethyl-anadrostane-3β,17α-diol.
9. 17β-aminomethyl-androstan-17α-ol-3-one.
10. A compound of the following formula:

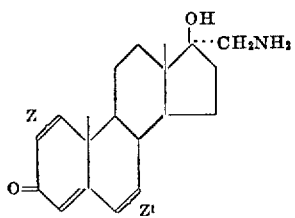

wherein Z is selected from the group consisting of a double bond and a saturated linkage between C-1 and C-2 and $Z^1$ is selected from the group consisting of a double bond and a saturated linkage between C-6 and C-7.

11. 17α-aminomethyl-testosterone.
12. 17α-aminomethyl-$\Delta^{1,4}$-androstadien-17β-ol-3-one.
13. 17α-aminomethyl-$\Delta^{4,6}$-androstadien-17β-ol-3-one.
14. 17α-aminomethyl-$\Delta^{1,4,6}$-androstatrien - 17β - ol - 3-one.
15. A compound of the following formula:

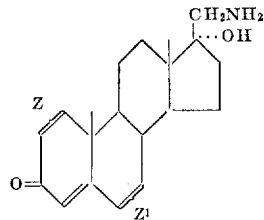

wherein Z is selected from the group consisting of a double bond and a saturated linkage between C-1 and C-2 and $Z^1$ is selected from the group consisting of a double bond and a saturated linkage between C-6 and C-7.

16. 17β-aminomethyl-isotestosterone.
17. 17β-aminomethyl-$\Delta^1$-dehydro-isotestosterone.
18. 17β-aminomethyl-$\Delta^{1,4,6}$-androstatrien - 17α - ol - 3-one.
19. 17β-aminomethyl-$\Delta^{4,6}$-androstadien-17α-ol-3-one.
20. The acetate of 17α-acetamidomethyl-testosterone.
21. The acetate of 17β-acetamidomethyl-isotestosterone.

No references cited.

UNITED STATES PATENT OFFICE
CERTIFICATE OF CORRECTION

Patent No. 3,102,126                                            August 27, 1963

Pierre Crabbé

It is hereby certified that error appears in the above numbered patent requiring correction and that the said Letters Patent should read as corrected below.

Column 6, line 71, and column 7, line 17, for "-anadrostane-", each occurrence, read -- -androstane- --.

Signed and sealed this 31st day of March 1964.

(SEAL)
Attest:

ERNEST W. SWIDER                              EDWARD J. BRENNER

Attesting Officer                                  Commissioner of Patents